United States Patent Office 2,830,051
Patented Apr. 8, 1958

2,830,051

PROCESS FOR THE PREPARATION OF DIESTERS AND MONOESTERS OF ISOCYANURIC ACID

Helmut Meis and Hubert Sauer, Letmathe, Germany, assignors to Rütgerswerke-Aktiengesellschaft, Frankfurt am Main, Germany No Drawing. Application August 26, 1955
Serial No. 530,907

Claims priority, application Germany September 1, 1954

7 Claims. (Cl. 260—248)

This invention relates to the preparation of esters of isocyanuric acid and it has particular relation to the preparation of monoesters and diesters of isocyanuric acid from triesters of cyanuric acid.

Several processes for preparing mono- and di-esters of isocyanuric acid have been known from the art.

Thus, according to the process described in Berichte der deutschen Chem. Gesellschaft, vol. 58, p. 1320, isoesters of cyanuric acid are obtained as by-products in the distillation of the potassium salt of cyanic acid with alkalisalts of alkylsulfuric acid.

According to another known process, triesters of cyanuric acid are converted by partial saponification with $Ba(OH)_2$ or alkalis into the corresponding acid esters (see Beriche der deutchen Chem. Gesellschaft, vol. 19, p. 2067). The yields of this process, i. e. about 30%, are, however, not satisfactory. Furthermore, preparation of the acid esters of cyanuric acid, the starting materials for this process, according to the German Patent No. 854,801 from cyanuric chloride and the respective alcohol, is rather troublesome in view of the needed large amounts of solvents and long reaction periods and yields the desired cyanuric esters only after the substitution of the Cl still present, by the —OH group. Subsequent thermal rearrangement of the resulting product to isocyanuric acid esters must then also follow.

Thus, these known processes are very troublesome and require several steps in order to obtain the desired compounds.

According to the U. S. Patent No. 2,536,849, isocyanuric acid triesters are prepared by reacting under pressure alkali cyanates with organic halides in the presence of solvents, whereby small amounts of symmetrical dialkyl ureas are formed as by-products.

It has now been found that isocyanuric acid monoesters and isocyanuric acid diesters can be prepared easily and in simple manner from cyanuric acid triesters, which are easy to prepare and some of which are available in commerce, by dissolving the cyanuric acid triesters in a suitable solvent in the presence of a catalyst of the type described hereinafter, and subjecting the reaction mixture to heating, whereby the desired reaction takes place.

The reaction can be conducted with the formation of the diester or monoester. If the reaction mixture contains only the cyanuric acid triester and the catalyst, then always the isocyanuric acid diester is formed. If it is desired to split off a further alcohol radical, an aromatic hydroxy compound which acts as an "acceptor" on the split off alcohol radical with the formation of the corresponding aromatic ether, must be present in the reaction mixture. For example, in the treatment of triallyl cyanurate as the starting material, the alkyl ether of phenol is formed in the presence of phenol in the reaction mixture in addition to the alkyl monoester. The aromatic hydroxy compound is used in an amount of at least 1 mol and less than 2 mols, preferably in an amount of 1–2 mols for each mol of the cyanuric acid triester.

The diester and monoester formed in the process of the invention, are simultaneously rearranged to the corresponding isoesters.

As examples of aromatic hydroxy compounds, phenol ($C_6H_5OH$), chlorinated phenols, e. g. o-chlorophenol, 3,5-dichlorophenol, and alkylated phenols, e. g. the various cresols and the various xylenols are mentioned.

The monoesters and diesters of isocyanuric acid are crystalline substances which can be recrystallized from hot water. However, in general, they are obtained directly in such a pure condition that they can be further processed without recrystallization. In carrying out the process of the invention preferably solvents are used in which a sufficiently high reaction temperature can be obtained and in which the substances to be formed are as little as possible soluble at ordinary room temperature, e. g. 15°–20° C. In using such solvents, the desired reaction products can be isolated simply by filtration after cooling off the reaction mixture.

As examples of such solvents aromatic hydrocarbons, e. g. benzene, toluene, xylene, cumene, and chlorinated aliphatic hydrocarbons, are mentioned.

The catalyst used should be acid catalysts, or acid forming catalysts, or surface-active catalysts of the type of bleaching earths, e. g. boron trifluoride diacetic acid which gave the best results, or bleaching earths of acid character. The former can be used in an amount of 0.5–5% and the bleaching earths in an amount of 1–10%, based on the weight of the triester used as the starting material.

The reaction according to the invention proceeds very smoothly. This could not be expected in view of the known tendency of cyanuric acid esters to polymerize (see French Patent No. 953,307 and Chem. Zentralblatt, 1950, II, 588).

In order to carry out the process of the invention, the solution of the triester in the solvent is carefully heated in the presence of the catalyst to boiling temperature of the solvent and is maintained at this temperature until the reaction is completed. The reaction mixture is then allowed to cool, whereby the reaction product separates by crystallization and is recovered by filtration. If a bleaching earth or the like is used as catalyst, the latter is removed by filtration of the solution which has been kept as hot as possible, whereupon the filtered hot solution is further processed in the above described manner. In some cases the reaction is strongly exotherm and it is then advisable to heat a mixture of the solvent and catalyst and to add the triester drop by drop and thus control the reaction by adjusting the velocity of the feed.

The ethers formed in the presence of aromatic hydroxy compounds can be recovered from the filtered liquid, after the removal of the solvent, by distillation.

The following examples describe some embodiments and best modes of carrying out the invention, to which the invention is not limited.

*Example 1*

50 parts of triallylcyanurate are dissolved in 100 parts of xylene and to the solution 0.5 part of boron trifluoride diacetic acid are added. The solution is heated to about 110° C., and at this temperature the reaction starts. The temperature quickly increases and the reaction proceeds with the evolution of heat, until completed. Upon cooling a crystalline precipitate is formed, which is recovered by filtration. 37–40 parts of isocyanuric acid diallylester having a melting point of 146°–148° C. are obtained, in a yield of 83–95% of the theory.

*Example 2*

50 parts of triallylcyanurate are dissolved in 100 parts of cumene and to the solution 5 parts of activated bleaching earth (which has a pH of 3.4 in aqueous suspension)

are added. The mixture is heated to boiling under reflux and kept boiling. The reaction is completed after 3 hours, whereupon the hot mixture is filtered in order to separate the bleaching earth. The filtered liquid is allowed to cool, whereby 35-38 parts of isocyanuric acid diallylester separate as a crystalline precipitate, which is recovered by filtration. The yield amounts to 83-90% of the theory.

*Example 3*

20 parts of tripropylcyanurate are dissolved in 50 parts of xylene and to the solution 0.3 part of boron trifluoride diacetic acid are added. The solution is heated to boiling under reflux for 1 hour and then allowed to cool. The crystalline substance separating during cooling is isolated by filtration. 14 parts of isocyanuric acid dipropylester having a melting point of 138°-139° C. are thus recovered. The yield amounts to 84% of the theory.

*Example 4*

25 parts of trimethyl cyanurate are dissolved in 100 parts of toluene and to the solution 0.5 part of boron trifluoride diacetic acid are added. The solution is then heated to boiling under reflux for 2 hours. After this period the reaction mixture is allowed to cool, whereby a precipitate of 20 parts of crystalline isocyanuric acid dimethyl ester is formed and isolated by filtration. The melting point of this compound is 222°-225° C. and the yield amounts to 87% of the theory.

*Example 5*

100 parts of triallycyanurate and 74 parts of phenol ($C_6H_5OH$) (corresponding to a molucular ratio of 1:2) are dissolved in 200 parts of xylene and to the solution 10 parts of activated bleaching earth are added. The mixture is heated under stirring and refluxing to boiling and heating is continued for 4 hours. The bleaching earth is separated by filtering the hot solution and from the filtrate 66 parts of isocyanuric acid monoallylester having a melting point of 209°-211° C. are isolated by crystallization upon cooling and filtration. The yield amounts to 98.5% of the theory.

By distillation of the filtrate 80 parts of phenolallyl ether having a boiling point of B. $P._{11}=72.5°$ C. and corresponding to a yield of 75% of the theory are obtained, in addition to a small amount of phenol.

*Example 6*

If in the above Example 5 an equimolecular amount of m-cresol is substituted for the phenol, under otherwise equal conditions 60 parts of isocyanuric acid monoallylester, i. e. a yield of 88.5% of the theory and 82 parts of m-cresylether, corresponding to 70% of the theory are obtained, together with some free m-cresol.

*Example 7*

50 parts of triallylcyanurate are treated under the conditions described in the above Example 1, but using as catalyst 1 part of $SnCl_4$. By proceeding in the manner described in Example 1, 25-28 parts of isocyanuric acid diallylester, corresponding to 56-63% of the theory, are obtained.

*Example 8*

50 parts of triallylcyanurate and 29 parts of β-naphthol are dissolved in 150 parts of xylene and to the solution 7.5 parts of activated bleaching earth are added. The further procedure is the same as that described in the above Example 5. By this procedure 60 parts of isocyanuric acid monoallylester corresponding to a yield of 90% of the theory, are obtained. The β-naphthol-allylether formed as a by-product is recovered from the filtered liquid by distillation.

It will be understood from the above that this invention is not limited to the specific compounds, solvents, conditions and other details specifically described above and can be carried out with various modifications without departing from the scope of the invention as defined in the appended claims. For example, instead of the cyanuric acid triesters described above, other triesters of cyanuric acid, e. g. the triethylester and the triisoamylester can be treated according to the process of this invention. Other examples of the acid or acid-forming catalysts are borontrifluoride acetic acid, boron trifluoride, $AlCl_3$, $ZnCl_2$, $TiCl_4$, $FeCl_3$, or mixtures of these halides chloroacetato fluoboric acid, if desired in mixture with lactatofluoboric, oleatofluoboric, or benzoatofluoboric acid. The surface active catalysts used according to this invention are surface active inorganic materials which are known in commerce under the name "bleaching earths" and are described for example in the monographs "Oskar Kausch: Das Kieselsäuregel und die Bleicherden" and "Eckhart-Wirzmüller: Die Bleicherden, ihre Gewinnung und Verwendung." Specific examples of these catalysts are the bleaching earths known in commerce under the name "Bleichton C," "Tonsil AC" fuller's earth and activated clays of the bentonite group.

The parts and percent described in this application are by weight if not otherwise stated. The symbol B. $P._{11}$ denotes the boiling temperature at a pressure of 11 mm. of mercury.

The products prepared according to this invention can be used as intermediate products in the manufacture of dyes, pharmaceuticals, and synthetic plastics.

Reference is made to the co-pending application filed in the United States Patent Office in the name of Helmut Meis and Hubert Sauer under Serial Number 530,908 on August 26, 1955 in Division 6.

What is claimed is:

1. A process for converting a triester of isocyanuric acid, selected from the group consisting of the trimethyl ester, triethyl ester, tripropyl ester, triallyl ester and triisoamyl ester into a corresponding lower ester from the group consisting of monoesters and diesters, said process comprising heating up to boiling under reflux the cyanuric acid triester in an aromatic hydrocarbon solvent in the presence of an alkylation catalyst selected from the group consisting of boron trifluoride diacetic acid and surface-active bleaching earth catalysts until the desired lower ester of the isocyanuric acid is formed.

2. A process as claimed in claim 1, in which heating of the reactants is continued until the cyanuric acid diester is formed.

3. A process as claimed in claim 1, in which the conversion is carried out in the presence of a phenolic compound which is thereby converted into the corresponding ether, said phenolic compound being selected from the group consisting of phenol ($C_6H_5OH$), chlorinated phenols, cresols and xylenols and being used in an amount of at least 1 mol and less than 2 mols for each mol of the cyanuric acid triester, and heating is continued until the monoester is formed.

4. A process as claimed in claim 1, in which a solvent is used, in which the reaction products are soluble at elevated temperature and from which said reaction products separate upon cooling.

5. A process as claimed in claim 1, in which a surface-active bleaching earth is used as catalyst.

6. A process as claimed in claim 5, in which the catalyst is separated from the reaction mixture by filtration of the hot reaction mixture and the filtered liquid is allowed to cool in order to separate the reaction products by crystallization.

7. A process as claimed in claim 3, in which the reaction is carried out in the presence of 1-2 mols of phenol ($C_6H_5OH$) for 1 mol of the cyanuric acid triester.

No references cited.